Jan. 4, 1966  A. SIMMON  3,227,039
DENSITY CONTROL FOR PHOTOGRAPHIC ENLARGERS
Filed July 16, 1963  4 Sheets-Sheet 1
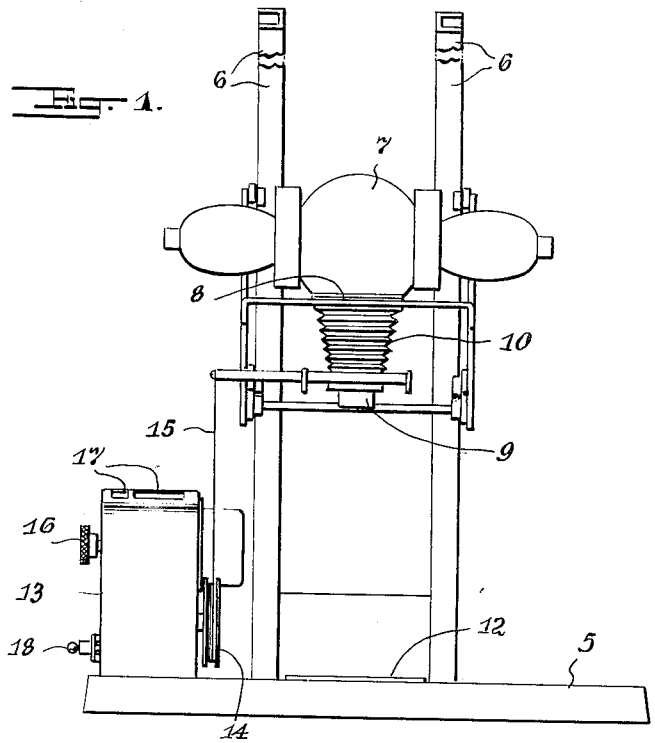
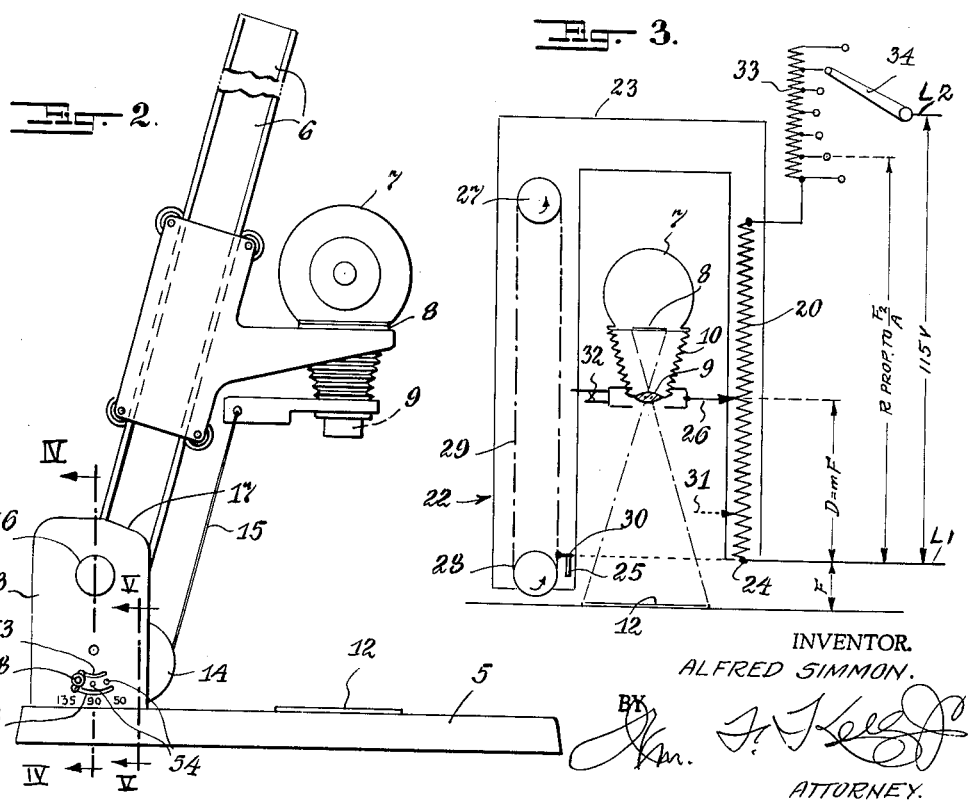
INVENTOR.
ALFRED SIMMON.
ATTORNEY.

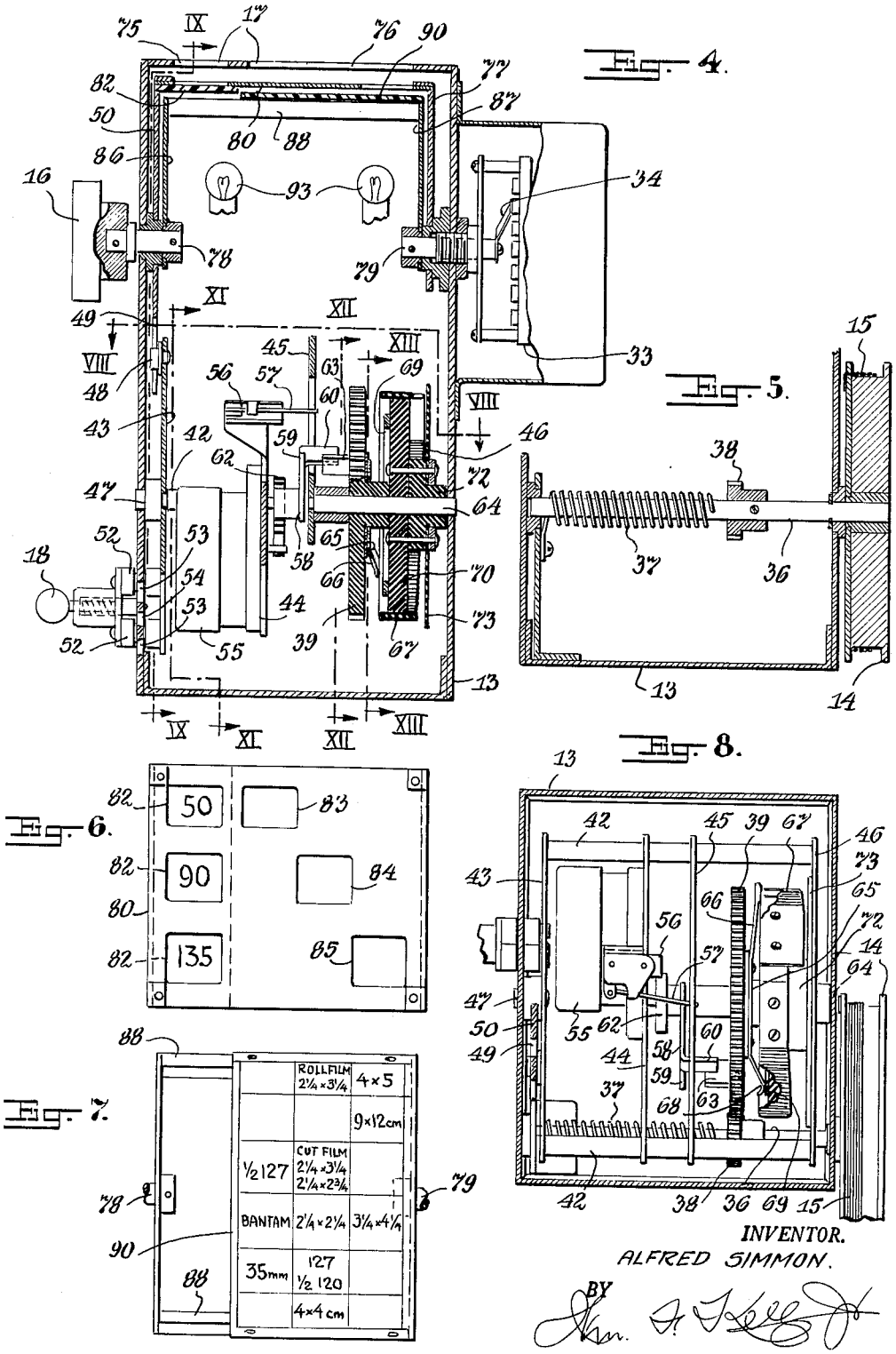

Jan. 4, 1966 A. SIMMON 3,227,039
DENSITY CONTROL FOR PHOTOGRAPHIC ENLARGERS
Filed July 16, 1963 4 Sheets-Sheet 3
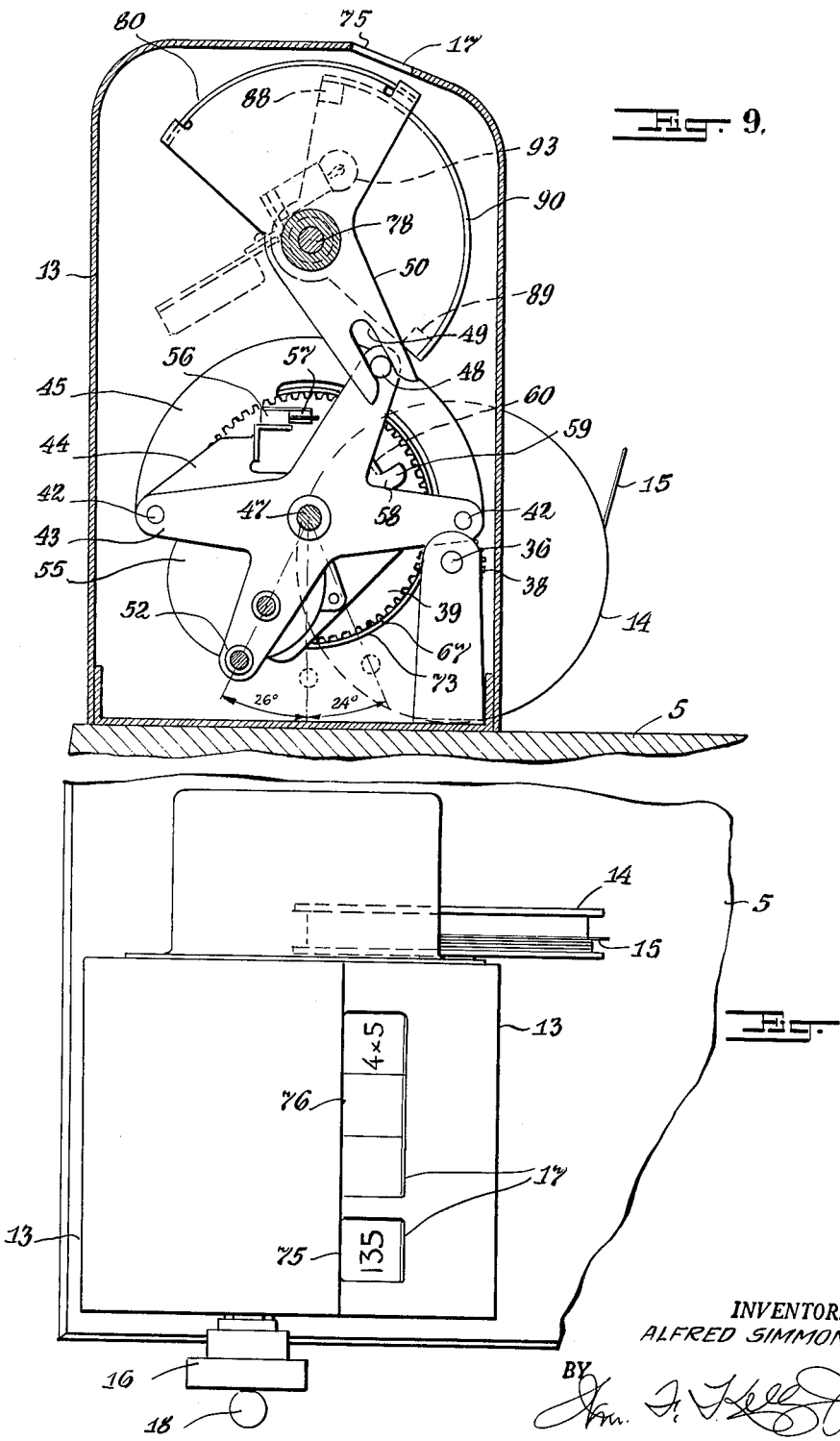
INVENTOR.
ALFRED SIMMON.
BY
ATTORNEY.

Jan. 4, 1966        A. SIMMON        3,227,039
DENSITY CONTROL FOR PHOTOGRAPHIC ENLARGERS
Filed July 16, 1963                              4 Sheets-Sheet 4
Fig. 11.
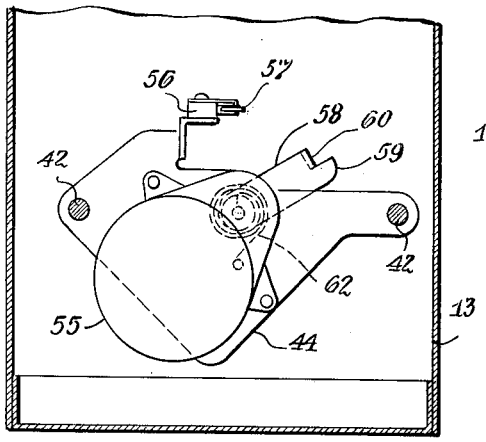
Fig. 12.
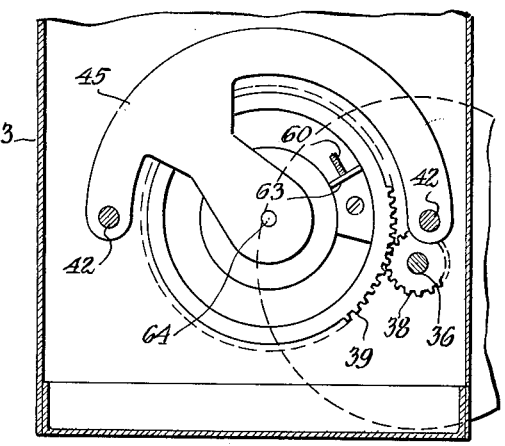
Fig. 13.
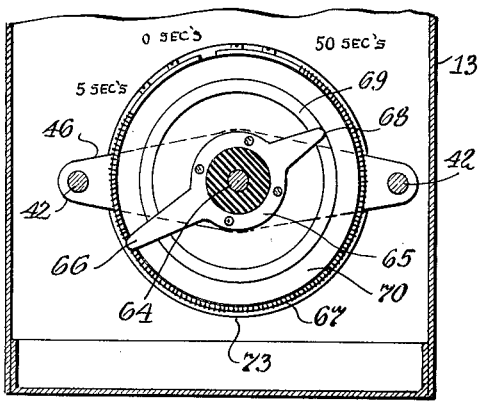
Fig. 14.
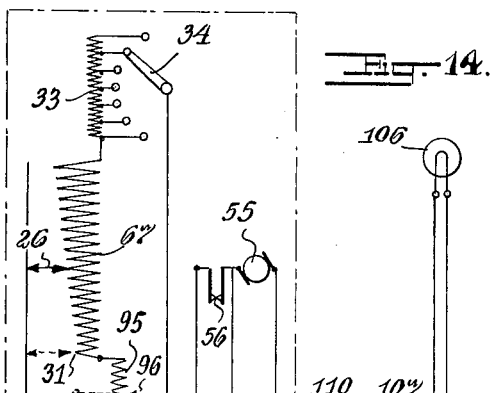
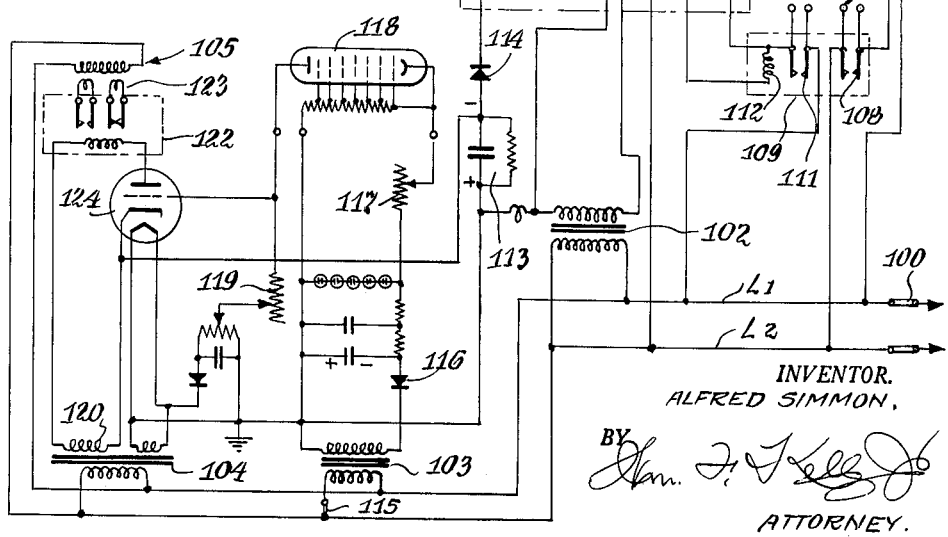
INVENTOR.
ALFRED SIMMON.
BY
ATTORNEY.

United States Patent Office

3,227,039
Patented Jan. 4, 1966

3,227,039
DENSITY CONTROL FOR PHOTOGRAPHIC ENLARGERS
Alfred Simmon, Garden City, N.Y., assignor to Simmon Brothers, Inc., Long Island City, N.Y., a corporation of New York
Filed July 16, 1963, Ser. No. 295,313
7 Claims. (Cl. 88—24)

The present invention relates to an exposure control device for the making of photographic enlargements, and more particularly to an analogue computing device for preselecting the light flux that must pass the lens of a photographic enlarger in order to produce an exposed print of desired density, and constitutes an improvement over the arrangement shown and claimed in U.S. Patent No. 3,086,709, granted April 23, 1963, of which I am one of the joint patentees.

In this previously issued patent an electrical network was provided which produces a voltage proportional to the light flux that must pass the lens of a photographic enlarger in order to produce a properly exposed enlarged print. Such voltage as disclosed was a function of the exposure time which is freely selected by the operator, and of the magnification ratio to which the enlarger is adjusted. However, this arrangement made it necessary for the operator to read the magnification on a scale affixed to the enlarger and then to adjust a circuit element, such as a potentiometer or the like, accordingly. The range of this prior control arrangement was thus somewhat unduly restricted to avoid the operator choosing illogical settings, such as combining small magnifications with long exposure times, or vice versa, so that even the lowest possible voltage would not be unnecessarily low and thus too inaccurate or the highest volage unduly high and accordingly too dangerous.

The present invention eliminates the disadvantages inherent in the disclosure of the above-noted patent by automatically setting the time switch which controls the exposure time by the adjustment of the enlarger itself thus eliminating the necessity for the operator to read the magnification ratio and then adjust a dial.

Another object of the present invention is to increase the range of the density control arrangement by an increase in the ratio of the largest to the smallest magnification to which the device can be adjusted coupled with the elimination of the operator inadvertently choosing any illogical settings.

A further object of the present invention is to provide a density control device for photographic enlargers wherein an operator needs only to set the device for the focal length of the enlarging lens and the size of the negative in order to produce an enlarged print having the desired density.

The foregoing objects of the present invention, together with other objects which will become apparent from the following description, are achieved by the provision of a timer and a voltage control forming part of an analogue computing device and which is connected to the enlarger head so that adjustment of the focal length of the enlarger lens relative to a preselected setting of the timer and the voltage control will produce an enlarged print of desired density from a film transparency.

The present invention can be readily understood by those skilled in the art by reference to the accompanying drawings wherein:

FIGURE 1 is a front elevational view of a photographic enlarger constructed in accordance with the present invention, FIGURE 2 is a side elevational view of the enlarger as shown in FIG. 1, FIG. 3 is a schematic illustration, showing one simple form which the present invention may take, for explanatory purposes, FIG. 4 is a sectional view on an enlarged scale of a portion of the enlarger as shown by the broken line IV—IV in FIG. 2, FIG. 5 is a fragmentary sectional view taken on the line V—V of FIG. 2, FIG. 6 is a top plan view of a part of the mechanism within the housing portion of FIG. 1 and shows aligned and spaced indicia denoting focal length to which the enlarger lens may be adjusted, FIG. 7 is a top plan view of a portion of the mechanism within the housing which carries some of the indicia observable through the windows of FIG. 6 and denoting film size, FIG. 8 is a sectional view taken on the line VIII—VIII of FIG. 4 and looking in the direction indicated by the arrows, FIG. 9 is a vertical sectional view taken on the line IX—IX of FIG. 4, FIG. 10 is a fragmentary top plan view of the mechanism housing and showing the windows through which the indicia can be observed which is carried by the elements shown in FIGS. 6 and 7, FIG. 11 is a sectional view taken on the line XI—XI of FIG. 4, FIG. 12 is a sectional view taken on the line XII—XII of FIG. 4, FIG. 13 is a sectional view taken on the line XIII—XIII of FIG. 4, and FIG. 14 is a diagrammatical showing of the electrical circuitry of the present invention.

Referring now more particularly to the drawings which illustrate practical embodiments of the present invention, there is shown in FIG. 1 an enlarger apparatus of conventional design comprising a base 5 provided with a pair of upright supports 6 on which a so-called "enlarger head" is vertically movable at the will of an operator. Such enlarger head or projector comprises a lamp-housing 7, which may take the form as shown in U.S. Patent No. 3,028,483 assigned to the same assignee as the present invention, a negative stage 8, a lens 9 and a bellows 10 connecting the negative stage and lens. The distance between the negative stage 8 and the lens 9 may be varied by adjustment of the bellows 10 in any suitable manner, for the purpose of properly focusing an image from a film transparency carried by the negative stage 8 on to sensitized paper 12 disposed on the base 5, as is well known in the art.

In addition to the conventional enlarger head as above described the enlarger of the present invention includes a housing 13 carried by the base 5 and enclosing certain mechanism as hereinafter described. However, as can be seen from FIGS 1 and 2 such housing carries a pulley 14 on which a cable 15 is wound with the free end of such cable connected to the lens mount and hence in horizontal alignment with the enlarger lens 9. A selector knob 16 is provided on the side of the housing 13 which is rotatable by the operator for the purpose of preselecting certain negative sizes that appear in a transparent window 17 in the top of the housing 13. Below such selector knob 16 the housing 13 is also provided with a spring-biased retractable plunger 18, also selectably movable by the operator for adjusting the mechanism within the housing 13 and causing certain indicia to also appear at the top which is observable through the transparent window 17 and indicating focal length setting of the mechanism, as hereinafter more fully described.

By reference now more particularly to FIG. 3, the principal parts of the apparatus of the present invention as therein shown comprises a potentiometer 20 and an electrically operated time switch 22 both mounted upon an inverted U-shaped supporting plate 23. This plate 23 may be affixed to the base 5 or to another intervening support in such a way that this plate 23 itself is adjustable, so that the distance from the lower end 24 of the potentiometer 20 and the lower stop 25 of the time switch 22, always equals the focal length of the enlarger lens 8 that is being employed. It will be noted that the potentiometer 20 actually comprises a linear resistor which begins at the lower end 24 and is as long as the longest vertical movement of the enlarger head with the electrical resistance thus uniformly distributed over the entire length of this linear resistor. A sliding contact 26 disposed in the same horizontal plane as the lower principal point of lens 9 is attached to, but insulated from, the lens mount and maintains a sliding electrical contact with the potentiometer-resistor 20.

The time switch 22 carried by the supporting plate 23, for purposes of clarity in explanation, is shown as having a straight line motion instead of the usual rotating one and comprises two sprockets 27 and 28 which are connected by a link chain 29.

During an exposure in the making of a print by the enlarger head one of these sprockets is rotated (counter-clockwise as seen in FIG. 3) by a small synchronous clock motor of the customary type (not shown). A projection 30, affixed to one of the links of chain 29, normally rests upon the lower stop 25 under gravity or spring bias but upon the counter-clockwise rotation of the sprockets 27 and 28, the chain 29 causes the projection 30 to disengage the lower stop 25 and move upwardly with a constant velocity, until it engages one of a pair of normally closed contacts 32 also attached but insulated from the mount of lens 9 in the same horizontal plane as such lens and the sliding contact 26, to cause opening of these contacts 32 with deenergization of the exposure-initiating relay (not shown).

The present invention may be still better understood by the following computation of certain parameters which are involved. For example, it is well known that the average light flux that each square inch of sensitized paper of a given sensitivity must receive equals a constant divided by the exposure time (neglecting for the moment "failure of reciprocity" to be hereinafter explained). The total light flux, which of course must pass the lens before it impinges upon the paper, is therefore equal to the light flux per square inch multiplied by the square inch area of the projected image. The area of this image in turn equals the area of the negative, or more precisely the area of the aperture of the negative holder, multiplied by the square of the linear magnification.

This may be therefore expressed as:

$$L \text{ proportional to } Am^2/T$$

where

L is the total light flux passing the lens and impinging upon the paper
A is the area of the aperture of the negative holder, usually referred to as the negative size
$m$ is the linear magnification
T is the exposure time.

Referring again to FIG. 1 it will be apparent that for a given focal length F of lens 9 and a certain magnification, the distance between the lower principal point of the lens 9 and the plane of the sensitized paper 12 becomes $F(1+m)$. Since the vertical distance between point 24 and the plane of the sensitized paper 12 has been made equal to F, the remaining distance D between point 24 and that of sliding contact 26 becomes:

$$D = mF$$

or $$m = D/F$$

Since the projection 30 is moved upwardly at a constant velocity by the time switch 22 during an exposure, the exposure time (i.e. the elapsed time until normally closed contacts 32 are opened) is proportional to the distance from lower stop 25 to contacts 32, which is the same as D:

Therefore $$L \text{ is proportional to } A\frac{D^2}{F^2}\cdot\frac{1}{D}$$

$$L \text{ is proportional to } \left(\frac{A}{F^2}\right)\cdot D$$

Obviously, if a certain voltage is impressed upon resistor 20, the voltage between its lower end 31 and sliding contact 26 will be a fraction of this voltage and proportional to D. If now the voltage across this linear resistor 20 is made proportional to $A/F^2$, the voltage between end 24 and sliding contact 26 becomes automatically proportional to $$\left(\frac{A}{F^2}D\right)$$

and therewith proportional to the light flux that must pass the lens 9 in order to produce a satisfactory print.

The voltage supplied to resistor 20 may be regulated by any well known means, such as an autotransformer or for simplicity a rheostat 33 in series with the resistor 20. Such rheostat may have a sliding contact but preferably is provided with a number of taps engageable by a suitable step switch 34, as shown in FIG. 3, with a suitable voltage, such as the usual commercial supply of 115 volts, connected to the resistor end 24 and the step switch 34. Since the voltages impressed upon resistor 20 should be proportional to values of $A/F^2$, the total resistance values for the different steps of switch 34 (i.e. between the end 24 and switch 34) must be inversely proportional to values of $A/F^2$ (or what is the same, proportional to $F^2/A$ values), so that each step of switch 34 then denotes a certain combination of focal length and negative size.

From the foregoing explanation some of the salient advantages of the present invention should now become apparent. Since lens of long focal length are used for large negatives and lens of short focal length for small negatives, the values of $F^2/A$ vary relatively little, usually no more than in the ratio of 2:1. This obviates the necessity of providing for very high or very low voltage values, which is always a potential obstacle in the design of any analogue computer. Furthermore, some positions of the step switch 34 can be used for more than one combination of focal length and negative area which makes for economy, since $F^2/A$ has the same value for 4″ x 5″ film and 135 mm. focal length or 2¼″ x 3¼″ rollfilm and 90 mm. focal length.

Although a device built according to FIG. 3 is entirely satisfactory in principle, it would assume awkward and impractical dimensions since the straight line movements of the timer and potentiometer would be exceptionally inconvenient. Accordingly, a more practical design is shown in the remaining figures of the drawing and which is built into the housing 13 shown in FIGS. 1 and 2 and mounted on the base 5 to one side of the enlarger. By reference more particularly to FIGS. 4, 5 and 8, it will be noted that the lower portion of the housing 13 contains the timer and potentiometer assembly while the upper portion thereof supports the tapped rheostat and associated step switch together with an indicating device which shows through the window 17 the combination of focal length and negative size to which the device has been selectively adjusted. Since the enlarger head is customarily movable upon its supports 6 for a distance of approximately 30 inches, in order to confine the rotation of pulley 14 to less than one revolution this would require a diameter of greater than 10 inches which again would be impractical. Accordingly the pulley 14 is of approximately 3 inches in diameter and is affixed to a shaft 36 suitably journaled inside the housing and biased in a direction opposite to the unreeling of cable 15 by a coil spring 37 (FIGS. 5 and 8), which shaft 36 makes several revolutions under reeling and unreeling of the cable 15 therefrom during movement of the enlarger head upon its supports 6, with the cable held taut by spring 37.

A gear 38 affixed to this shaft 36 meshes with a larger gear 39 having such a ratio therebetween that this larger gear makes less than one revolution when driven by gear 38 for the entire vertical length of travel of the lens mount carried by the enlarger head. The timer and potentiometer assembly are mounted on and supported by a pivoted frame consisting of two cylindrical rods 42 (FIG. 8) that are connected by four transverse members 43, 44, 45 and 46. The member 43 comprises a flat stamping with four arms (FIG. 9) and in the center thereof has a pivot 47 journaled in the housing 13 while its two horizontal arms are attached to the cylindrical rods 42 (FIG. 8). The upper arm of stamped member 43 carries a pin 48 meshing in a slot 49 provided in a depending part of a sideplate 50 of a trunnion which forms part of an indicating device to be hereafter described. The lower arm of stamped member 43 is provided with two spacers 52 which protrude through two arcuate slots 53 in the front wall of the housing 13 (FIG. 2) and support the spring-biased retractable plunger 18, the inner end of which engages one of the several holes 54 in the front wall of the housing 13 (FIG. 2) thereby determining the angular position of the entire timer and potentiometer assembly in the housing 13 as selected by the operator, and representative of three enlarger lens of 135 mm., 90 mm., and 50 mm. focal length, respectively.

The second transverse member 44 (FIG. 11), also attached to the two rods 42, carries a small synchronous motor 55 of the usual clock-type as well as a switch 56, which may be of the type now well known in industry as a "microswitch," and having a protruding actuating arm 57 (FIGS. 4, 8 and 11). Attached to the shaft of motor 55 is an arm 58 having two projections 59 and 60 so that as the motor rotates the arm 58 in a counter-clockwise direction (FIG. 11), the projection 59 contacts the switch actuating arm 57 to deenergize the motor 55 and terminate the exposure. A special spring 62 then returns the actuating arm 58 back in a clockwise direction (FIG. 11) until projection 60 contacts a stop projection 63 forming part of the "setting" mechanism. It will be noted that the two transverse members 45 and 46 are not only connected to the two cylindrical rods 42 but also to a stationary shaft 64, the right end (FIGS. 4 and 8) of which serves as a bearing for the pivoted frame formed by the aforesaid cylindrical rods 42 and the transverse members 43, 44, 45 and 46, and with such frame being journaled at its other side by the pivot 47 as previously mentioned. The large gear 39, which is preferably made of suitable insulating material such as nylon or Bakelite and in mesh with the small gear 38, is rotatably mounted on the shaft 64. This gear 39 is provided with the above mentioned laterally extending stop projection 63 and on its opposite face carries a resilient contact 65 made of nickel-silver or beryllium-copper.

The stop projection 63 actually constitutes the setting member of the time switch formed by motor 55 and switch 56 because it determines the rest position of the arm 58 since it is in the path of movement of projection 60 carried by the latter and which is rotated in a clockwise rotation (FIG. 11) by the spring 62 following termination of an exposure. The length of the exposure is, of course, proportional to the angle that arm 58 travels in a counter-clockwise direction (FIG. 11) from its rest position adjacent to projection 63 (FIGS. 4 and 8) until the arm projection 59 engages actuating switch arm 57 of switch 56 to thus terminate the exposure. The resilient contact 65 carried by insulating gear 39 has two ends, one of which 66 makes sliding contact with a circularly disposed resistance element 67 and the other 68 making sliding contact with a metal ring 69, as seen particularly in FIG. 13. Both the resistance element 67 and metal ring 69 are affixed to an insulating disk 70 which through a spacer 72 is secured to the transverse member 46. The resistance element 67 is formed in the usual manner as a so-called "card" by winding a large number of convolutions of thin resistance wire on a strip of flexible insulating material which is then wrapped around and attached to the periphery of disk 70. Also as a precautionary measure a circular sheet of insulating paper or the like 73 separates the resistance element 67 from transverse member 46.

As can be seen more particularly from FIG. 4, the upper part of the housing 13 supports the tapped rheostat 33 and associated step switch 34 as well as the previously mentioned indicating device for the selected focal length and negative size. Since the tapped rheostat 33 and step switch 34 are commercially available well known elements a detailed description thereof is deemed superfluous. The indicating device comprises two trunnions operatively connected, respectively, to the pivoted frame of the timer-potentiometer assembly and to the step switch 34. The transparent window 17 in the top of the housing 13 is formed of two openings, one of which 75 is substantially square and through which the focal length is shown and the other opening 76 being oblong and through which the size of the negative is observable, as shown more clearly in FIG. 10.

By reference now more particularly to FIGS. 4 and 9 the two trunnions of the indicating device are shown as being immediately below the openings 75 and 76. The first trunnion comprises the aforesaid side plate 50 and another side plate 77 (FIG. 4) each journaled for rotation about a pair of short shafts 78 and 79 and which shafts themselves pass through bearings in the wall of casing 13. The side plate 50 is longer than plate 77 and below its bearing shaft 78 is provided with the aforesaid slot 49 engaged by the pin 48 on the transverse member 43. These two side plates 50 and 77 are interconnected by a semi-cylindrical sheet metal part 80, shown separately in FIG. 6, and which may be regarded as a mask having six rectangular openings. Immediately below the three aligned openings the metal part 80 carries translucent plastic plates 82 bearing the respective legends "50," "90" and "135" showing focal lengths which will selectively appear through the opening 75 of casing window 17 at the will of the operator, while the three staggered openings 83, 84 and 85 are for displaying negative sizes. Accordingly, when the operator retracts the spring-pressed plunger 18 and moves it into a selected hole 54 (FIG. 2) corresponding to a predetermined focal length, the timer-potentiometer frame is rotated by the transverse member 43 about the pivot 47 and the shaft 64. At the same time the pin 48 carried by the transverse member 43 and extending into the slot 49 causes opposite rotation of the first trunnion about its pivots 78 and 79 through side plate 50, thus aligning the translucent plastic plate 82, bearing the same focal length indicia as that to which the spring-pressed plunger 18 was set, immediately beneath the opening 75 of casing window 17.

The second trunnion also comprises two side plates 86 and 87, the lower ends of which are secured to the short shafts 78 and 79 and with such side plates being interconnected by two rectangular studs 88 and 89 which carry a semi-cylindrically curved piece of translucent plastic 90 having thereon inscribed indicia denoting negative sizes. Such plastic piece with its indicia is shown separately in FIG. 7 from which it will be noted that the rows of film sizes thereon noted do not employ uniform identification but rather utilize the nomenclature of the art by resorting in some instances to sizes in inches, others in sizes by millimeters, and others by trade names or catalogue numbers. Accordingly, upon rotation of this second trunnion, by the selector knob 16 carried by the short shaft 78 exteriorly of the housing 13, such trunnion is rotated about the bearings in the housing walls in which the shafts 78 and 79 are journaled thus bringing a selected one of the film size indicia (FIG. 7) on the plastic piece 90 in alignment with one of the staggered openings 83, 84 or 85 (FIG. 6), only one of which will then be immediately beneath the rectangular opening 76 of window 17 and in the same plane with the preselected focal length indicia appearing in opening 75 of the window 17.

The preselected focal length and film size thus appearing in the housing window 17 is readily discernible to the operator, since light from small electric lamps 93 (FIGS. 4 and 9) passes through the translucent plastic pieces 82 and 90 to illuminate the indicia denoting the focal length and film size as selected by the operator. At the same time, rotation of this second trunnion causes the short shaft 79 to also rotate the step switch 34 into contact with one of the taps of the rheostat 33 to thus select the desired voltage commensurate with the selected focal length and film size, each of which appears in the respective openings 75 and 76 of housing window 17. It should thus be apparent that the indicating device comprising the two trunnions as above described eliminates any possible ambiguity that might otherwise exist because some steps of switch 34 may be used for more than one negative size and it also prevents the operator from inadvertently selecting absurd combinations such as long focal length and small negative size or vice versa.

In the density control device of the present invention as thus far described no provision has been made for "failure of reciprocity" which for present purposes may be expressed as the decrease in light sensitivity of the sensitized paper when exposure times are increased and being particularly noticeable in connection with sensitized color paper. Such "failure of reciprocity" is accordingly compensated for by the present invention in two ways. First, the "card" upon which the resistance element 67 is wound is not of uniform width but tapered so that the end (denoted "50 sec." in FIG. 13 and upper end in FIG. 14) of resistance element 67 corresponding to long exposure times is of higher resistance than the other end corresponding to short exposure times. This variation in resistance is obtained by varying the width of the "card" on which the resistance element 67 is wound in accordance with the formula $$W = W_0 \left(\frac{L}{L_0}\right)^{.26}$$

Such formula is based on the empirical fact that in a system as shown in FIG. 3 doubling the magnification necessitates doubling the exposure time and at the same time multiplying the light intensity by a factor of 2.4 instead of its customary doubling, which is sufficient for paper not afflicted by reciprocity failure.

Secondly, compensation for "failure of reciprocity" is made by so positioning the sliding contact (26 of FIGS. 3 and 14 and 66 of FIG. 13) and hence the lens 9 of the enlarger, that at their lowest setting the position of this sliding contact on the resistance element (20 and 67) is necessarily always considerably higher than zero magnification of the lens 9 carried by the enlarger head 7. The low resistance end of the resistance element (20 and 67) is thus electrically terminated at a point 31 (FIGS. 3 and 14) above the end 24 with the omitted portion then replaced with an adjustable rheostat 95 (FIG. 14) which at its midpoint 96 has the same electrical resistance as that of the omitted portion or that between points 24 and 31. Such rheostat 95 can therefore be adjusted to higher or lower values which thus affects the voltage representing the light flux through the lens 9 when the enlarger is at the low end of its adjustment and exposure times are short but has substantially no effect when the enlarger is moved to its high adjustment and exposure times are long. Moreover, it should be apparent that the adjustment for this compensation by the rheostat 95 is empirical. A print with a large magnification is first made with each new batch of sensitized paper from which prints are to be made and then several prints are made with a small magnification and different settings of rheostat 95. The rheostat setting that renders a small print of the same density as the large one is thus established as the norm.

Referring now in detail to the circuit of FIG. 14 a main line switch 100 connects the apparatus to a source of electrical energy L1–L2 at the customary commercial potential. Upon closure of this switch 100 electrical energy is supplied to the primary winding of a plurality of transformers 102, 103, 104 and also to the field coil of a reversible "shaded pole" motor 105 which operates a light controlling element, such as a lens diaphragm or adjustable filter (not shown), customarily used to vary the light flux from the electric lamp 106 within the lamphousing 7 and impinging upon the sensitized paper 12 (FIGS. 1, 2 and 3). The electric lamp 106 likewise is energized from the supply mains L1–L2 upon closure of a focusing switch 107 or by closure of a pair of normally open contacts 108 of a timer relay 109. Similarly, the aforementioned timer motor 55 receives energy from the supply conductors L1–L2 upon the depression of a pushbutton switch 110, which thereupon energizes a self-holding coil 112 of the timer relay 109 to close its self-holding contacts 111 and causing the timer motor 55 to rotate, until the normally closed microswitch 56 (FIGS. 4, 8 and 11) is opened when its actuating arm 57 is contacted by the arm projection 59 on timer motor arm 58 to thereby deenergize the timer-relay self-holding coil 112.

Transformer 102 through its secondary winding produces a certain D.C. voltage across a capacitor-resistance combination 113, since the capacitor thereof is charged through a rectifier 114, with the magnitude of this D.C. voltage across such capacitor controlled by the adjustment of the resistance element 67 and the rheostats 33 and 95. The transformer 103 is connected to the supply mains L1–L2 by a switch 115 and its secondary winding supplies energy through a rectifier 116 and a sensitivity control 117 to a photomultiplier tube 118. The D.C. voltage passing this photomultiplier tube and which is built up across an adjustable density control resistor 119 is dependent upon the magnitude of the light flux impinging on such photomultiplier tube 118 when placed in front of the lens 9 before an exposure. Such D.C. voltage thus appearing across the density control resistor 119 is opposed to the D.C. voltage appearing across the capacitor-resistance combination 113.

The main secondary winding 120 of transformer 104 constitutes the supply source for a motor relay 122, provided with one normally open and one normally closed pair of contacts for alternately closing the circuit to one or the other of the coils 123 of the "shaded pole" motor 105. The motor relay 122 is controlled by a thyratron tube 124, the thermionic cathode of which receives heating energy from low voltage secondary 125 of the transformer 104, and with such thyratron 124 receiving a D.C. grid biasing voltage from an adjustable resistor and capacitor combination 126. It will also be noted that the output voltage across the capacitor-resistance combination 113 is connected across the screen grid and cathode of thyratron tube 124 and that the previously mentioned opposed D.C. voltage across the density control resistor 119 appears across the control grid and cathode of such thyratron tube 124. Accordingly, depending upon the small grid bias voltage together with the polarity difference between these two opposed D.C. voltages, the thyratron tube 24 becomes conductive and non-conductive causing the motor relay 122 to close one or the other of the two shading coils 123 of the reversible motor 105 with rotation thereof in one direction or the other.

In operating the density control apparatus of the present invention the operator first adjusts it in accordance with the focal length of the lens and the size of the negative. To do this the selector knob 16 is rotated until the indicia (FIG. 7), corresponding to the size of the negative 8 (FIG. 3), and which is carried by the translucent plastic 90 appears through one of the staggered openings 83, 84 or 85 (FIG. 6) aligning at the moment with the opening 76 in the housing window 17. The rotation of the trunnion carrying such translucent plastic 90 also rotates the step switch 34 into engagement with one of the taps of rheostat 33 which thus selects a voltage setting forming a part of the combination denoting the focal length and negative size, as previously mentioned. Next the operator moves the spring-biased retractable plunger 18 into one of the selected openings 54 (FIG. 2) corresponding to the focal length of the lens 9 which at the moment is being utilized in the enlarger head. Positioning of such plunger 18 in the proper opening 54 accordingly rotates the flat stamping 43 about its pivot 47 in the housing 13, through an angle of 26°, 24° or their sum of 50°, as seen in FIG. 9, depending upon the initial position of plunger 18 and that to which it is then adjusted.

Inasmuch as the flat stamping 43 is connected by the pin 48 and slot 49 to the side plate 50 of the trunnion carrying the sheet metal part 80, movement of such stamping about its pivot 47 likewise causes opposite rotation of the trunnion about its pivot shafts 78 and 79 thus aligning the proper focal length indicia 82 with the opening 75 in housing window 17 and corresponding precisely to the same focal length selected by the operator in positioning the plunger 18. Since the flat stamping 43 is one of the four transverse members, which together with cylindrical rods 42 form the previously mentioned pivoted frame, the rotation of the stamping 43 about its pivot 47 simultaneously causes rotation of such entire frame with the opposite outside transverse member 46 rotating about the stationary shaft 64. Such rotation of the pivoted frame accordingly orientates the clock motor 55 and microswitch 56, as well as the resistance element 67, at definite radial positions about the axis of stationary shaft 64 and with the position of microswitch arm 57 circumferentially preselected relative to the stop projection 63 on insulated large gear 39.

Following this focal length and film size setting of the apparatus the operator then depresses the focusing switch 107 (FIG. 14) to energize the lamp 106 and the position of the enlarger is then adjusted until the projected image from the negative 8 has the desired size. The adjustment of the enlarger head thus causes the cable 15 to rotate the pulley 14 and since this turns shaft 36 and small gear 38 against the tension of coil spring 37 the meshing large gear 39 is rotated in an opposite direction. Such rotation of the large gear 39 accordingly changes the circumferential position of the stop projection 63 carried thereby relative to microswitch arm 57 and simultaneously the voltage setting is altered by movement of contact 66 on resistance 67, to thus set the exposure time in accordance with the magnification to which the enlarger head is set, as previously explained.

Since the main line switch 100 is then closed the transformer 102 is energized which thus causes a certain voltage to be built up across the capacitor-resistance element combination 113, the magnitude of which depends upon the position to which the step switch 34 was set by rotation of selector knob 16 and the position of contact 66 on resistance element 67, as set by rotation of the large gear 39 in response to adjustment of the enlarger head. The photomultiplier tube 118 is then placed in front of the enlarger lens so that light from the lamp 106 falls thereon and then switch 115 is closed to energize transformer 103. The voltage built up across density control resistor 119 thus depends upon the light flux falling on the photomultiplier tube 118 and since such voltage is in opposition to that across the capacitor-resistance element 113 and both of which are supplied to the thyratron tube 124, such tube becomes conductive or non-conductive causing the motor relay 122 to energize the reversible motor 105.

Since such motor 105 operates the aforesaid iris diaphragm or adjustable filter this controls the light flux through the lens 9 and the system is in equilibrium when the two opposed voltages across capacitor-resistance combination 113 and the density control resistor 119 balance each other, which is obtained by adjustment of the latter. It should perhaps be mentioned that since the system has inertia it will not positively stop at the point of equilibrium but will "overshoot," reverse itself, and again overshoot, i.e., it will break into oscillations. However, it is possible to make the amplitude of these oscillations quite small so that the state of oscillation is not sufficiently different for all intent and purposes from that of equilibrium. Having thus established a proper setting for the iris diaphragm or adjustable filter, the photomultiplier tube is then removed from in front of the enlarger lens and again deenergized by opening of the switch 115.

Next the focusing switch 107 is opened to extinguish the lamp 106, a sheet of sensitized paper is placed on enlarger base 5, and a timed exposure initiated by momentary depression of the push-button 110 which energizes the timer relay 109. The energized relay coil 112 then closes its contacts 108 and 111 which again illuminates the lamp 106 and at the same time starts the timer motor 55. This motor continues its rotation until the projection 59 on arm 58 engages actuating arm 57 of the microswitch 56 to open the latter and deenergizing timer relay 109 thereby terminating the exposure. Following such termination the coil spring 62 attached to timer arm 58 causes reverse rotation of this timer arm until projection 60 engages the stop projection 63 protruding from large gear 39 thus conditioning the timer for its next exposure.

Although the density control apparatus of the present invention has been shown and described herein only in connection with the making of a print from a black and white negative, it should be apparent that it can be just as readily applied to the making of color prints. To do so merely requires the addition of the same necessary elements for each primary color, such as photomultiplier tubes, potentiometers, reversible motors, etc., together with color filters of the three primary colors of red, green and blue in front of each photocell. The reversible motors would then adjust a color filter of the three complementary colors of cyan, magenta and yellow within the illuminating system of the enlarger, with the ratio of the three colors relative to each other preferably controlled by separate potentiometers connected together by linkage with output voltages compared precisely as herein disclosed for the single density control apparatus.

It should be obvious to those skilled in the art from the foregoing disclosure that a density control apparatus has been herein provided for the making of enlarged prints from film transparencies, wherein such apparatus is automatically responsive to vertical adjustments of the enlarger head in selecting the size of the desired print, to thereby preselect the proper exposure time for producing an enlarged print of desired density. Moreover, such density control apparatus although compact is nevertheless operable with fidelity in preselecting exposure time in accordance with magnification setting of the enlarger head, the focal length of the lens employed, and the size of the film to be enlarged.

Despite the fact that only one practical embodiment of the present invention has been herein shown and described, it is to be understood that still further modifications thereof may be made without departing from the spirit and scope of the appended claims.

What is claimed is:

1. A control device for photographic printers having an adjustable enlarger head carrying a light source and a lens, and operable to preselect the light flux emanating from said lens to produce a print of predetermined density comprising:
   (a) a housing,
   (b) a member within said housing adjustable by an operator to preselected positions corresponding to enlarger head lenses of different focal length,
   (c) a timer carried by said member and adjustable to preselect various exposure times and provided with a movable switch-actuating arm operable to cause termination of an exposure, (d) a potentiometer carried by said member having an adjustable contact operable to cause said potentiometer to produce voltages of different magnitude, (e) means operatively connecting the adjustable contact of said potentiometer and said timer to said enlarger head whereby the adjustment of the latter simultaneously moves said adjustable contact and said timer setting to cause said potentiometer to produce a voltage in accordance with the magnification ratio as selected by the adjustment of the enlarger head and for the time period determined by the setting of said timer, (f) a second member affixed to said housing and adjustable by the operator to preselected positions corresponding to negative area, (g) and an adjustable rheostat in said housing electrically connected to said potentiometer and provided with a contact operable by the adjustment of said second member to render the total resistance of the electrical system which includes said potentiometer and rheostat proportional to the square of the focal length divided by the area of the negative at all adjusted positions of said control device.

2. A control device for photographic printers having an adjustable enlarger head carrying a light source and a lens, and operable to preselect the light flux emanating from said lens to produce a print of predetermined density comprising:

(a) a housing, (b) a rotatable member within said housing adjustable by an operator to preselected positions about its pivot corresponding to enlarger head lenses of different focal length, (c) a timer carried by said rotatable member and adjustable to preselect various exposure times and provided with a movable switch-actuating arm operable to cause termination of an exposure, (d) a potentiometer carried by said member having an adjustable contact operable to cause said potentiometer to produce voltages of different magnitude, (e) means operatively connecting the adjustable contact of said potentiometer and said timer to said enlarger head whereby the adjustment of the latter simultaneously moves said adjustable contact and said timer setting to cause said potentiometer to produce a voltage in accordance with the magnification ratio as selected by the adjustment of the enlarger head and for the time period determined by the axial setting of the timer switch-actuating arm relative to said potentiometer, (f) a second rotatable member affixed to said housing and adjustable by the operator to preselected positions about its pivot corresponding to negative area, (g) and an adjustable rheostat in said housing electrically connected to said potentiometer and provided with a contact operable by the adjustment of said second rotatable member to render the total resistance of the electrical system which includes said potentiometer and rheostat proportional to the square of the focal length divided by the area of the negative at all adjusted positions of said control device.

3. A control device for photographic printers having an adjustable enlarger head carrying a light source and a lens, and operable to preselect the light flux emanating from said lens to produce a print of predetermined density comprising:

(a) a housing, (b) a member within said housing adjustable by an operator to preselected positions corresponding to enlarger head lenses of different focal length, (c) a trunnion connected to said rotatable member and operable by rotation thereof to align indicia carried by said trunnion with a window in said housing to give a visible observation of the lens focal length as selected by adjustment of said rotatable member, (d) a timer carried by said member and adjustable to preselect various exposure times and provided with a movable switch-actuating arm operable to cause termination of an exposure, (e) a potentiometer carried by said member having an adjustable contact operable to cause said potentiometer to produce voltages of different magnitude, (f) means operatively connecting the adjustable contact of said potentiometer and said timer to said enlarger head whereby the adjustment of the latter simultaneously moves said adjustable contact and said timer setting to cause said potentiometer to produce a voltage in accordance with the magnification ratio as selected by the adjustment of the enlarger head and for the time period determined by the setting of said timer, (g) a second rotatable member affixed to said housing and adjustable by the operator to preselected positions about its pivot corresponding to negative area, (h) and an adjustable rheostat in said housing electrically connected to said potentiometer and provided with a contact operable by the adjustment of said second rotatable member to render the total resistance of the electrical system which includes said potentiometer and rheostat proportional to the square of the focal length divided by the area of the negative at all adjusted positions of said control device.

4. A control device for photographic printers having an adjustable enlarger head carrying a light source and a lens, and operable to preselect the light flux emanating from said lens to produce a print of predetermined density comprising:

(a) a housing, (b) a member within said housing adjustable by an operator to preselected positions corresponding to enlarger head lenses of different focal length, (c) a trunnion connected to said rotatable member and operable by rotation thereof to align indicia carried by said trunnion with a window in said housing to give a visible observation of the lens focal length as selected by adjustment of said rotatable member, (d) a timer carried by said member and adjustable to preselect various exposure times and provided with a movable switch-actuating arm operable to cause termination of an exposure, (e) a potentiometer carried by said member having an adjustable contact operable to cause said potentiometer to produce voltages of different magnitude, (f) means operatively connecting the adjustable contact of said potentiometer and said timer to said enlarger head whereby the adjustment of the latter simultaneously moves said adjustable contact and said timer setting to cause said potentiometer to produce a voltage in accordance with the magnification ratio as selected by the adjustment of the enlarger head and for the time period determined by the setting of said timer, (g) a second rotatable member affixed to said housing and adjustable by the operator to preselected positions about its pivot and provided with indicia corresponding to negative size movable into alignment with the window in said housing to give a visible observation of the negative size as selected by adjustment of said second rotatable member, (h) and an adjustable rheostat in said housing electrically connected to said potentiometer and provided with a contact operable by the adjustment of said second rotatable member to render the total resistance of the electrical system which includes said potentiometer and rheostat proportional to the square of the focal length divided by the area of the negative at all adjusted positions of said control device.

5. A control device for photographic printers having an adjustable enlarger head carrying a light source and a lens, and operable to preselect the light flux emanating from said lens to produce a print of predetermined density comprising:
 (a) a housing,
 (b) a pivoted frame within said housing axially adjustable by an operator to preselected positions corresponding to enlarger head lenses of different focal length,
 (c) a potentiometer carried by said pivoted frame having a winding of non-linear resistance circumferentially disposed about the axis of said pivoted frame and movable therewith about its pivot and provided with an adjustable contact operable to cause said potentiometer to produce voltages of different magnitude including a voltage compensating for failure of reciprocity,
 (d) means operatively connecting the adjustable contact of said potentiometer to the enlarger head whereby the adjustment of the latter simultaneously moves said adjustable contact to cause said potentiometer to produce a voltage in accordance with the magnification ratio as selected by the adjustment of the enlarger head,
 (e) a trunnion affixed to said housing and adjustable by the operator to preselected positions about its axis corresponding to negative area,
 (f) and an adjustable rheostat in said housing electrically connected to said potentiometer and provided with a contact operable by the adjustment of said trunnion to cause the electrical system which includes said potentiometer and rheostat to be impressed with a total voltage proportional to the formula $F^2/A$, wherein "F" represents focal length of lens and "A" represents area of the negative to be printed.

6. A control device for photographic printers having an adjustable enlarger head carrying a light source and a lens, and operable to preselect the light flux emanating from said lens to produce a print of predetermined density comprising:
 (a) a housing,
 (b) a pivoted frame within said housing axially adjustable by an operator to preselected positions corresponding to enlarger head lenses of different focal length,
 (c) a timer carried by said member and adjustable to preselect various exposure times and provided with a movable switch-actuating arm operable to cause termination of an exposure,
 (d) a potentiometer carried by said pivoted frame having a winding of non-linear resistance circumferentially disposed about the axis of said pivoted frame and movable therewith about its pivot and provided with an adjustable contact operable to cause said potentiometer to produce voltages of different magnitude including a voltage compensating for failure of reciprocity,
 (e) means operatively connecting the adjustable contact of said potentiometer and said timer to the enlarger head whereby the adjustment of the latter simultaneously moves said adjustable contact to cause said potentiometer to produce a voltage in accordance with the magnification ratio as selected by the adjustment of the enlarger head and for the time period determined by the setting of said timer,
 (f) a trunnion affixed to said housing and adjustable by the operator to preselected positions about its pivot corresponding to negative area,
 (g) and an adjustable rheostat in said housing electrically connected to said potentiometer and provided with a contact operable by the adjustment of said trunnion to cause the electrical system which includes said potentiometer and rheostat to be impressed with a total voltage proportional to the formula $F^2/A$, wherein "F" represents focal length of lens and "A" represents area of the negative to be printed.

7. A control device for photographic printers having an adjustable enlarger head carrying a light source and a lens, and operable to preselect the light flux emanating from said lens to produce a print of predetermined density comprising:
 (a) a housing provided with a window,
 (b) a rotatable member within said housing axially adjustable by an operator to preselected positions corresponding to enlarger head lens of different focal length,
 (c) a trunnion connected to said rotatable member provided with an apertured mask having inscribed indicia denoting lens focal length covering said apertures and movable by the axial adjustment of said rotatable member to align said indicia with said housing window,
 (d) a second trunnion pivotally connected to said housing provided with a mask having staggered apertures covered by indicia denoting negative area and adjustable by an operator to preselected positions about its pivot to align the indicia covering a selected one of said staggered apertures with said housing window,
 (e) a light source within said housing for illuminating the indicia carried by both said masks when aligned with said housing window,
 (f) a timer carried by said rotatable member and adjustable to preselect various exposure times and provided with a movable switch-actuating arm operable to cause termination of an exposure,
 (g) a potentiometer carried by said rotatable member having an adjustable contact operable to cause said potentiometer to produce voltages of different magnitude,
 (h) means operatively connecting the adjustable contact of said potentiometer and said timer to the enlarger head whereby the adjustment of the latter simultaneously moves said adjustable contact and said timer setting to cause said potentiometer to produce a voltage in accordance with the magnification ratio as selected by the adjustment of the enlarger head and for the time period determined by the setting of said timer,
 (i) and an adjustable rheostat in said housing electrically connected to said potentiometer and provided with a contact operable by the axial adjustment of said second trunnion to cause the electrical system which includes said potentiometer and rheostat to be impressed with a total voltage proportional to the formula $F^2/A$, wherein "F" represents focal length of lens and "A" represents area of negative to be printed.

References Cited by the Examiner
UNITED STATES PATENTS

| | | | |
|---|---|---|---|
| 2,460,443 | 2/1949 | Benton | 88—24 |
| 3,052,156 | 9/1962 | Blatherwick | 88—24 |
| 3,086,709 | 4/1963 | Simmon et al. | 88—24 |

EVON C. BLUNK, *Primary Examiner.*

NORTON ANSHER, *Examiner.*

R. A. WINTERCORN, *Assistant Examiner.*